(12) United States Patent
Hong

(10) Patent No.: US 12,131,653 B2
(45) Date of Patent: Oct. 29, 2024

(54) METHOD AND DEVICE FOR CONFIGURING FLIGHT PATH

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 926 days.

(21) Appl. No.: 17/266,557

(22) PCT Filed: Aug. 6, 2018

(86) PCT No.: PCT/CN2018/099010
§ 371 (c)(1),
(2) Date: Feb. 5, 2021

(87) PCT Pub. No.: WO2020/029024
PCT Pub. Date: Feb. 13, 2020

(65) Prior Publication Data
US 2021/0295712 A1 Sep. 23, 2021

(51) Int. Cl.
*G08G 5/00* (2006.01)
*G05D 1/00* (2024.01)

(52) U.S. Cl.
CPC .......... *G08G 5/003* (2013.01); *G05D 1/0022* (2013.01); *G08G 5/0013* (2013.01); *G08G 5/006* (2013.01); *B64U 2201/00* (2023.01)

(58) Field of Classification Search
CPC ...... G08G 5/003; G08G 5/0013; G08G 5/006; G08G 5/0069; G08G 5/0026; G08G 5/0034; G08G 5/0043; G08G 5/0082; B64C 39/024; B64U 70/00; B64U 10/13; B64U 2201/00; H04B 7/18506
See application file for complete search history.

(56) References Cited

U.S. PATENT DOCUMENTS 9,927,807 B1  3/2018  Ganjoo
2016/0330771 A1  11/2016  Tan
(Continued)

FOREIGN PATENT DOCUMENTS

CN  106843263 A  6/2017
CN  108064360 A  5/2018
(Continued)

OTHER PUBLICATIONS

First Office Action of Indian Patent Application No. 202147009156 dated Jan. 27, 2022 with partial English translation, (7p).
(Continued)

*Primary Examiner* — Shon G Foley
(74) *Attorney, Agent, or Firm* — Arch & Lake LLP

(57) ABSTRACT

The present disclosure provides a method and a device for configuring a flight path. The method includes obtaining flight path information of an unmanned aerial vehicle in a connection state; determining a base station having a communication connection with the unmanned aerial vehicle; and sending a first signaling to the base station. The first signaling includes the flight path information, and the first signaling instructs the base station to send the flight path information to the unmanned aerial vehicle via a second signaling.

18 Claims, 10 Drawing Sheets

(56) References Cited

U.S. PATENT DOCUMENTS

2018/0247544 A1* 8/2018 Mustafic .............. G08G 5/0034
2020/0077321 A1* 3/2020 Shi .................... H04W 28/0215

FOREIGN PATENT DOCUMENTS

| CN | 108064465 A | 5/2018 | |
|---|---|---|---|
| EP | 2278732 A2 * | 1/2011 | ......... H04B 7/18506 |
| WO | 2018036609 A1 | 3/2018 | |

OTHER PUBLICATIONS

Extended European Search Report of EP Application No. 18929785.6 dated Feb. 28, 2022, (14p).
International Search Report to PCT/CN2018/099010 dated May 6, 2019 with English translation, (4p).
Xiaomi Communications, "R2-1808685: Discussion on the Procedure for the Flight Path Information Reporting" 3GPP TSG-RAN WG2 Meeting #102, May 25, 2018, (xp).
Huawei, et al., "R2-1805125: Discussion on Flight Path Information" 3GPP TSG-RAN WG2 Meeting #101bis, Apr. 20, 2018 (xp).

* cited by examiner

METHOD AND DEVICE FOR CONFIGURING FLIGHT PATH

CROSS-REFERENCE TO RELATED APPLICATION

This application is the national phase application of International Application No. PCT/CN2018/099010 filed on Aug. 6, 2018, the entire contents of which are incorporated herein by reference for all purposes.

TECHNICAL FIELD

The disclosure relates to the field of communication technologies, and more particularly to a method for configuring a flight path, an apparatus for configuring a flight path, an electronic device, and a computer-readable storage medium.

BACKGROUND

In the related art, when a flight path is configured for an unmanned aerial vehicle, flight path information needs to be sent to the unmanned aerial vehicle via a proprietary link. For example, the flight path information is sent to the unmanned aerial vehicle via a Wi-Fi (wireless fidelity) connection with the unmanned aerial vehicle or via a satellite forwarding way.

Presently, such ways for configuring the flight path for the unmanned aerial vehicle need to establish the proprietary link, and a configuration process is cumbersome.

SUMMARY

The present disclosure provides a method for configuring a flight path, an apparatus for configuring a flight path, an electronic device, and a computer-readable storage medium.

According to a first aspect of the present disclosure, there is provided a method for configuring a flight path. The method includes that a core network obtains flight path information of an unmanned aerial vehicle. The unmanned aerial vehicle is in a connection state. Additionally, the method includes determining a base station having a communication connection with the unmanned aerial vehicle and sending a first signaling to the base station. The first signaling includes the flight path information, and the first signaling instructs the base station to send the flight path information to the unmanned aerial vehicle via a second signaling.

According to a second aspect of the present disclosure, there is provided a method for configuring a flight path. The method includes that a base station receives a first signaling from a core network. The first signaling includes flight path information of an unmanned aerial vehicle, the first signaling instructs a base station to send the flight path information to the unmanned aerial vehicle via a second signaling, and the unmanned aerial vehicle is in a connection state. Additionally, the method incudes generating the second signaling based on the first signaling and sending the second signaling to the unmanned aerial vehicle. The second signaling includes the flight path information.

According to a third aspect of the disclosure, there is provided a method for configuring a flight path. The method includes that an unmanned aerial vehicle receives a second signaling from a base station. The second signaling is generated by the base station based on a first signaling sent by a core network, the first signaling includes flight path information of an unmanned aerial vehicle, the first signaling instructs the base station to send the flight path information to the unmanned aerial vehicle via the second signaling, and the unmanned aerial vehicle is in a connection state. Additionally, the method includes extracting the flight path information from the second signaling and configuring the flight path based on the flight path information.

According to a fourth aspect of the disclosure, there is provided an electronic device. The electronic device includes a processor and a memory. The memory is configured to store instructions executable by the processor. The processor is configured to obtain flight path information of an unmanned aerial vehicle in a connection state, determine a base station having a communication connection with the unmanned aerial vehicle, and send a first signaling to the base station. The first signaling includes the flight path information, and the first signaling instructs the base station to send the flight path information to the unmanned aerial vehicle via a second signaling.

According to a fifth aspect of the disclosure, there is provided a base station. The base station includes a processor and a memory. The memory is configured to store instructions executable by the processor. The processor is configured to receive a first signaling from a core network. The first signaling includes flight path information of an unmanned aerial vehicle, the first signaling instructs a base station to send the flight path information to the unmanned aerial vehicle via a second signaling, and the unmanned aerial vehicle is in a connection state. The processor is further configured to generate the second signaling based on the first signaling and send the second signaling to the unmanned aerial vehicle. The second signaling includes the flight path information.

According to a sixth aspect of the disclosure, there is provided an unmanned aerial vehicle. The unmanned aerial vehicle includes a processor and a memory. The memory is configured to store instructions executable by the processor. The processor is configured to receive a second signaling from a base station. The second signaling is generated by the base station based on a first signaling sent by a core network. The first signaling includes flight path information of an unmanned aerial vehicle. The first signaling instructs the base station to send the flight path information to the unmanned aerial vehicle via the second signaling. And the unmanned aerial vehicle is in a connection state. The processor is further configured to extract the flight path information from the second signaling and configure the flight path based on the flight path information.

BRIEF DESCRIPTION OF THE DRAWINGS

In order to describe the technical solution in embodiments of the disclosure more clearly, a brief introduction will be made below to accompanying drawings required in the description of embodiments. Obviously, the accompanying drawings in the following description are only a part of embodiments of the disclosure. For the skilled in the art, other accompanying drawings may be obtained based on these accompanying drawings without paying creative labor.

DETAILED DESCRIPTION

Description will be made clearly and completely below to the technical solution in embodiments of the disclosure with reference to the accompanying drawings in embodiments of the disclosure. Obviously, the described embodiments are only a part of embodiments of the disclosure, but not all the embodiments. Based on embodiments in the disclosure, all other embodiments obtained by the skilled in the art without creative labor belong to the protection scope of the disclosure.

Figure 1:
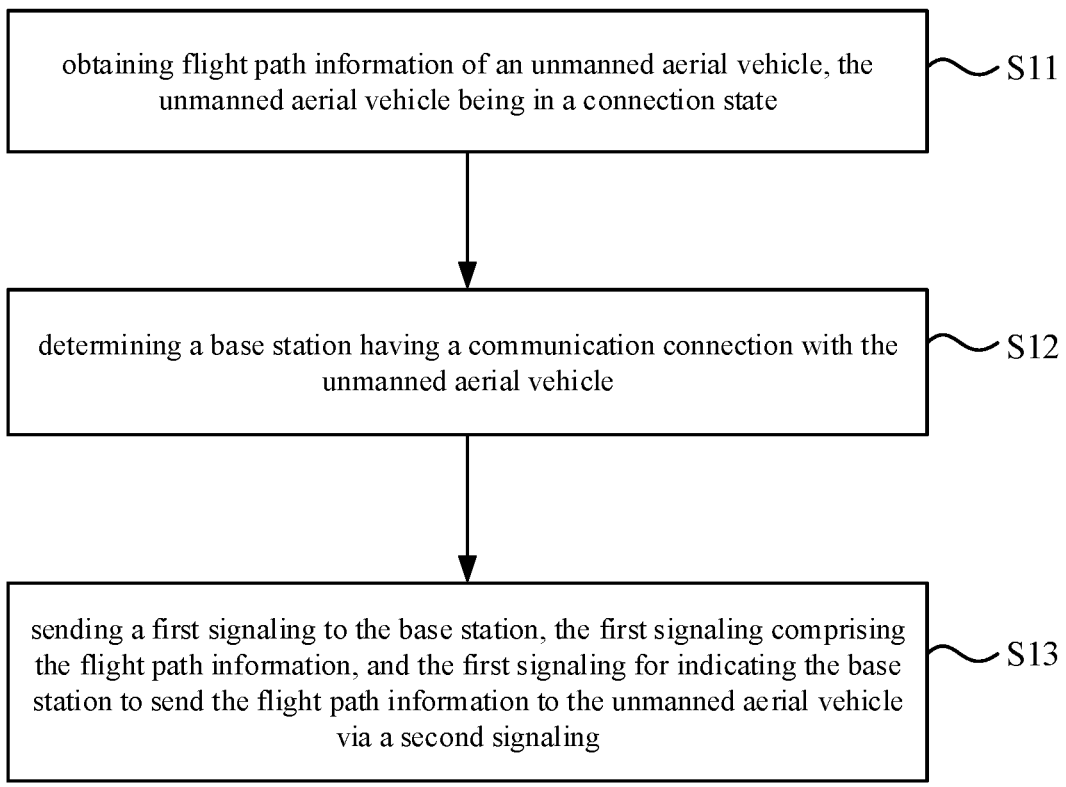
FIG. 1 is a flow chart illustrating a method for configuring a flight path according to exemplary embodiments of the disclosure.

FIG. 1 is a flow chart illustrating a method for configuring a flight path according to exemplary embodiments of the disclosure. The method for configuring the flight path illustrated in embodiments may be applicable to a core network. The core network may communicate with a base station. The base station may communicate with a user device. The user device may be an unmanned aerial vehicle. The unmanned aerial vehicle may be an unmanned aircraft, an unmanned airship or the like. A communication between the base station and the user device may be based on a long term evolution (LTE) or a new radio (NR).

As illustrated in FIG. 1, the method for configuring the flight path includes the following.

At block S11, flight path information of an unmanned aerial vehicle is obtained. The unmanned aerial vehicle is in a connection state.

In some embodiments, the flight path information may be configured by an unmanned aerial-vehicle management system. The unmanned aerial-vehicle management system may be, such as, a UTM (UAS traffic management). The UAS is the abbreviation of the unmanned aircraft system. The unmanned aerial-vehicle management system may run on a terminal. There may be a communication connection between the core network and the terminal, such that the flight path information of the unmanned aerial vehicle may be obtained from the terminal.

In some embodiments, the unmanned aerial vehicle is in the connection state, which means that there is a communication connection between the unmanned aerial vehicle and the base station. Since there is a communication connection between the base station and the core network, the core network may determine whether the communication connection between the unmanned aerial vehicle and the base station is disconnected. For example, when there is data transmission between the unmanned aerial vehicle and the base station, it may be determined that there is the communication connection between the unmanned aerial vehicle and the base station, that is, the unmanned aerial vehicle is in the connection state. When there is no data transmission between the unmanned aerial vehicle and the base station, it may be determined that the unmanned aerial vehicle is disconnected from the base station.

At block S12, a base station having a communication connection with the unmanned aerial vehicle is determined.

In some embodiments, since the unmanned aerial vehicle is in the connection state, and there is the communication connection between the base station and the core network, the core network may determine which base station has the communication connection with the unmanned aerial vehicle, thereby facilitating to subsequently send the flight path information to the unmanned aerial vehicle through the base station.

At block S13, a first signaling is sent to the base station. The first signaling includes the flight path information, and the first signaling is configured to indicate the base station to send the flight path information to the unmanned aerial vehicle via a second signaling.

In some embodiments, for the unmanned aerial vehicle in the connection state, since there is the communication connection between the unmanned aerial vehicle and the base station, the flight path information from the core network may be directly sent to the unmanned aerial vehicle through the base station. Therefore, the base station having the communication connection with the unmanned aerial vehicle may be determined first, and then the first signaling including the flight path information may be sent to the base station having the communication connection with the unmanned aerial vehicle. The base station is indicated by the first signaling to send the flight path information to the unmanned aerial vehicle via the second signaling. In this way, it is implemented that the flight path information may be sent from the core network to the unmanned aerial vehicle in the connection state, such that the unmanned aerial vehicle configures the flight path based on the flight path information. Comparing with the related art, the configuration of the flight path may be completed based on a network of a telecom operator without establishing a proprietary link, and a configuration process is relatively simple.

Figure 2:
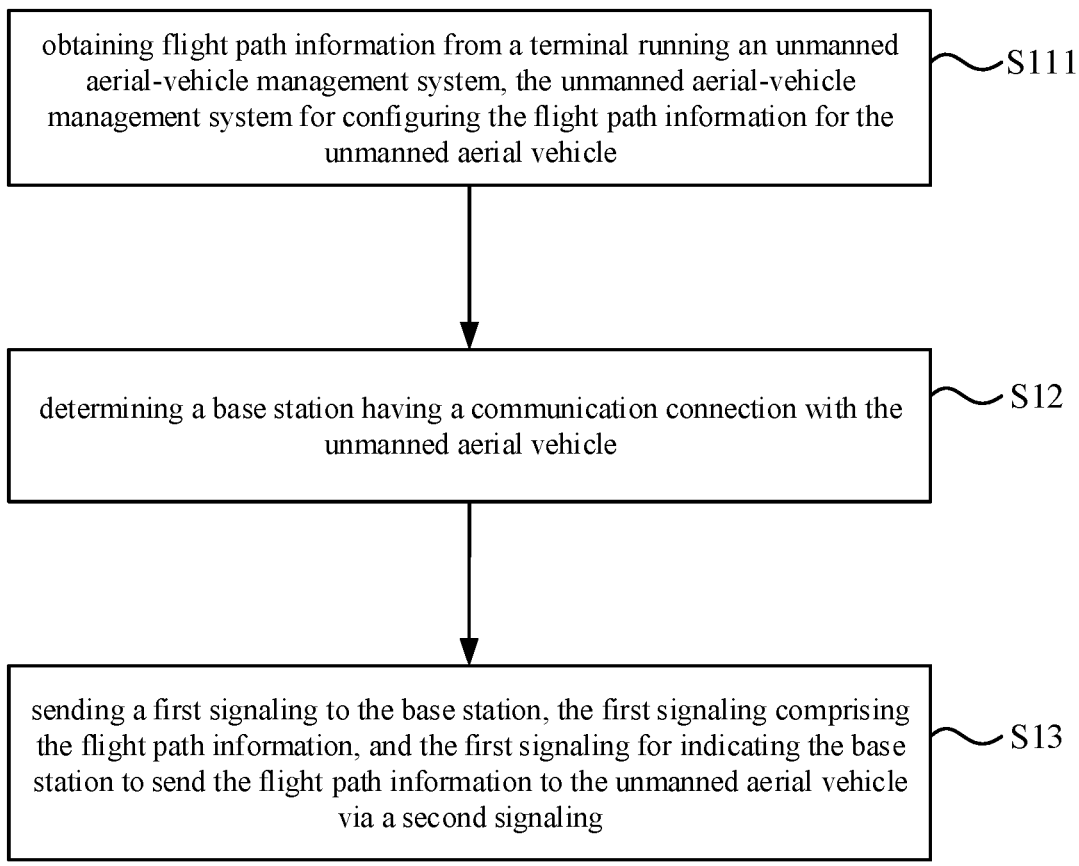
FIG. 2 is a flow chart illustrating another method for configuring a flight path according to exemplary embodiments of the disclosure.

FIG. 2 is a flow chart illustrating another method for configuring a flight path according to exemplary embodiments of the disclosure. As illustrated in FIG. 2, on the basis of embodiments illustrated in FIG. 1, obtaining the flight path information of the unmanned aerial vehicle includes the following.

At block S111, the flight path information is obtained from a terminal running an unmanned aerial-vehicle management system. The unmanned aerial-vehicle management system is configured to configure the flight path information for the unmanned aerial vehicle.

In some embodiments, the flight path information may be configured by the unmanned aerial-vehicle management system. The unmanned aerial-vehicle management system may run on the terminal. There may be the communication connection between the core network and the terminal, such that the flight path information of the unmanned aerial vehicle may be obtained from the terminal.

The terminal running the unmanned aerial-vehicle management system may be a device such as a server or a remote controller.

Alternatively, the first signaling includes at least one of: an initial context setup request, and a user equipment (UE) context modification request.

In some embodiments, the core network may send different first signaling to the base station based on a relationship between a timing of obtaining the flight path information and a connection state of the unmanned aerial vehicle and the base station, which may be described in detail in following embodiments.

Figure 3:
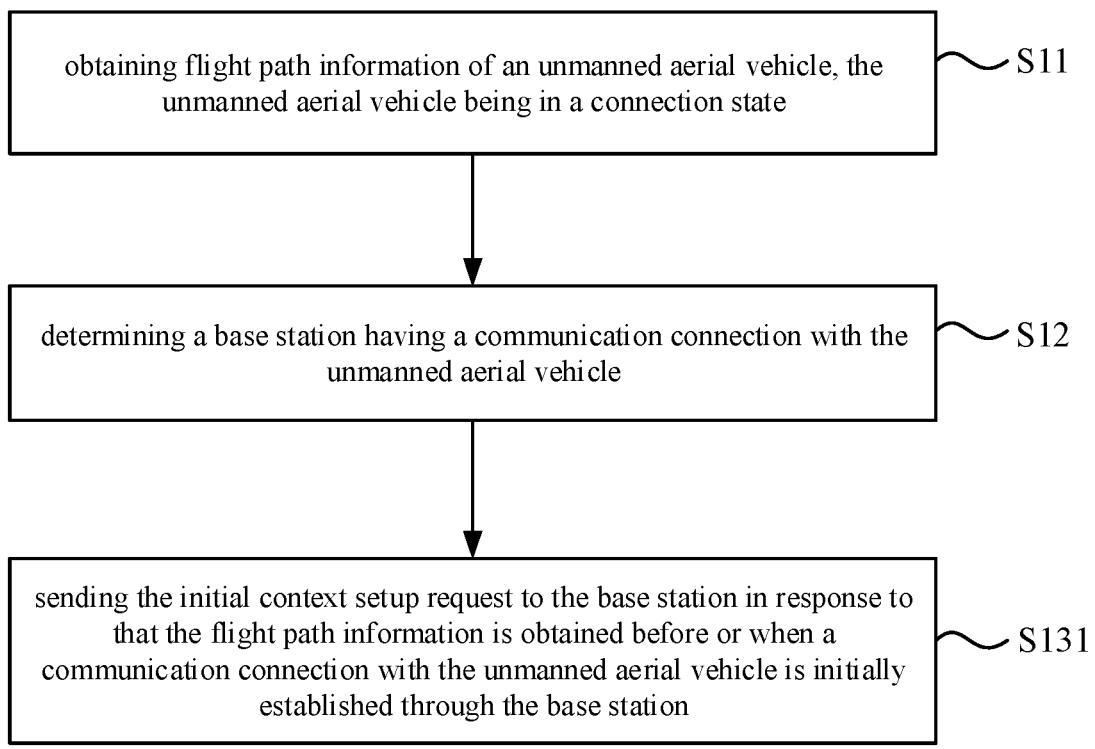
FIG. 3 is a flow chart illustrating another method for configuring a flight path according to exemplary embodiments of the disclosure.

FIG. 3 is a flow chart illustrating another method for configuring a flight path according to exemplary embodiments of the disclosure. As illustrated in FIG. 3, on the basis of embodiments illustrated in FIG. 1, sending the first signaling to the base station includes the following.

At block S131, the initial context setup request is sent to the base station in response to that the flight path information is obtained before or when a communication connection with the unmanned aerial vehicle is initially established through the base station.

In some embodiments, under a case that the core network obtains the flight path information when initially establishing the communication connection with the unmanned aerial vehicle through the base station, the configuration of the flight path for the unmanned aerial vehicle may be regarded as an initial configuration, such that the initial context setup request may be sent to the base station, and the flight path information may be carried in the initial context setup request.

In some embodiments, formats of the initial context setup request may be illustrated as Table 1.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| — | — | — | — | — | — | — |
| UE Sidelink Aggregate Maximum Bit Rate | O | | 9.2.1.122 | This IE applies only if the UE is authorized for V2X services. | YES | ignore |
| Enhanced Coverage Restricted | O | | 9.2.1.123 | | YES | ignore |
| NR UE Security Capabilities | O | | 9.2.1.127 | | YES | ignore |
| Flight Path Information | O | | 9.2.x.x | | YES | ignore |

The core network may send the initial context setup request to the base station via an S1 access point. The Flight Path Information in the initial context setup request is the flight path information.

Figure 4:
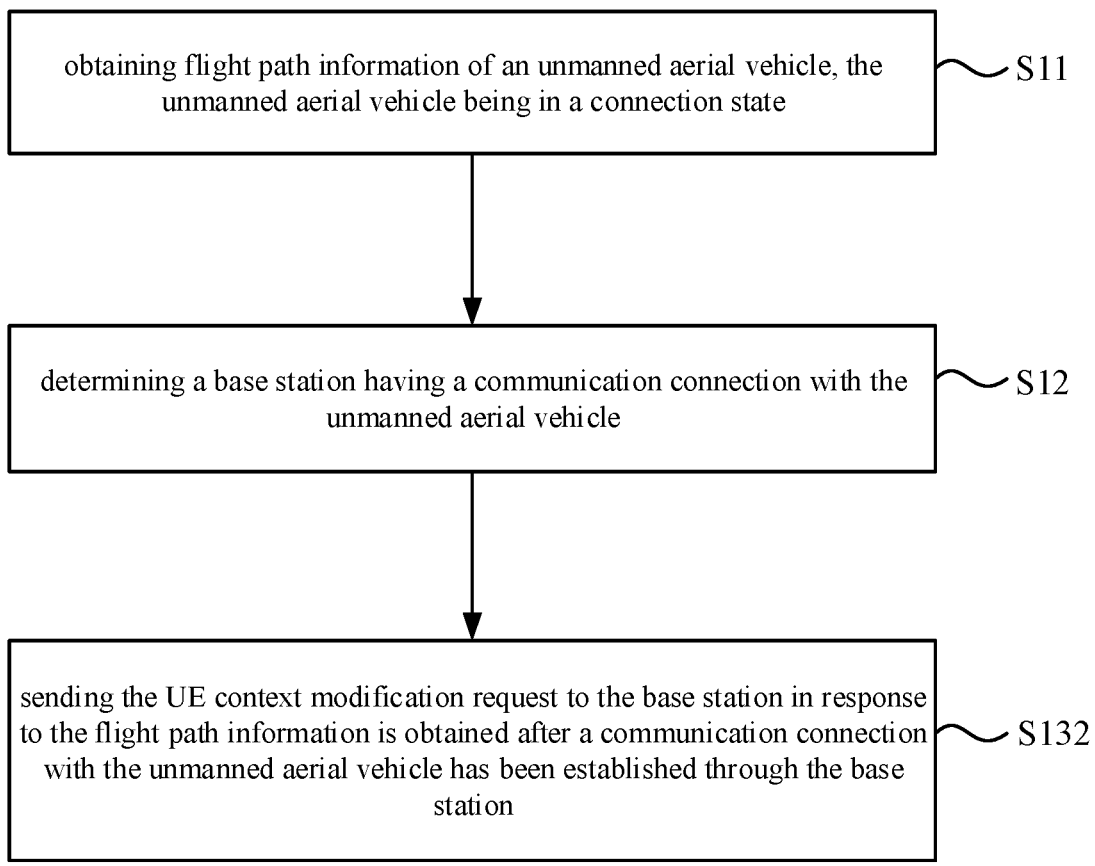
FIG. 4 is a flow chart illustrating another method for configuring a flight path according to exemplary embodiments of the disclosure.

FIG. 4 is a flow chart illustrating another method for configuring a flight path according to exemplary embodiments of the disclosure. As illustrated in FIG. 4, on the basis of embodiments illustrated in FIG. 1, sending the first signaling to the base station includes the following.

At block S132, the UE context modification request is sent to the base station in response to the flight path information is obtained after a communication connection with the unmanned aerial vehicle has been established through the base station.

In some embodiments, the core network has established the communication connection between the unmanned aerial vehicle through the base station. In this case, the flight path information is obtained. Therefore, configuring the flight path for the unmanned aerial vehicle may be regarded as configuration updating, so that the UE context modification request may be sent to the base station, and the flight path information is carried in the UE context modification request.

In some embodiments, formats of the UE context modification request may be illustrated as Table 2.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |

TABLE 2-continued

| IE/Group Name | Presence | Range | IE type and reference | Semantics description | Criticality | Assigned Criticality |
|---|---|---|---|---|---|---|
| eNB UE S1AP ID | M | | 9.2.3.4 | | YES | reject |
| UE Sidelink Aggregate Maximum Bit Rate | O | | 9.2.1.122 | This IE applies only if the UE is authorized for V2X services. | YES | ignore |
| NR UE Security Capabilities | O | | 9.2.1.127 | | YES | ignore |
| Flight Path Information | O | | 9.2.x.x | | YES | ignore |

The core network may send the UE context modification request to the base station via the S1 access point. The Flight Path Information in the UE context modification request is the flight path information.

Alternatively, the second signaling includes at least one of: a radio resource control signaling, and a media access control MAC control element CE.

In some embodiments, the core network may indicate the base station by the first signaling to send the flight path information to the unmanned aerial vehicle via the RRC (radio resource control) signaling or via the MAC CE. A way for sending the flight path information carried in the RRC signaling or in the MAC CE to the unmanned aerial vehicle may be selected based on a requirement.

Figure 5:
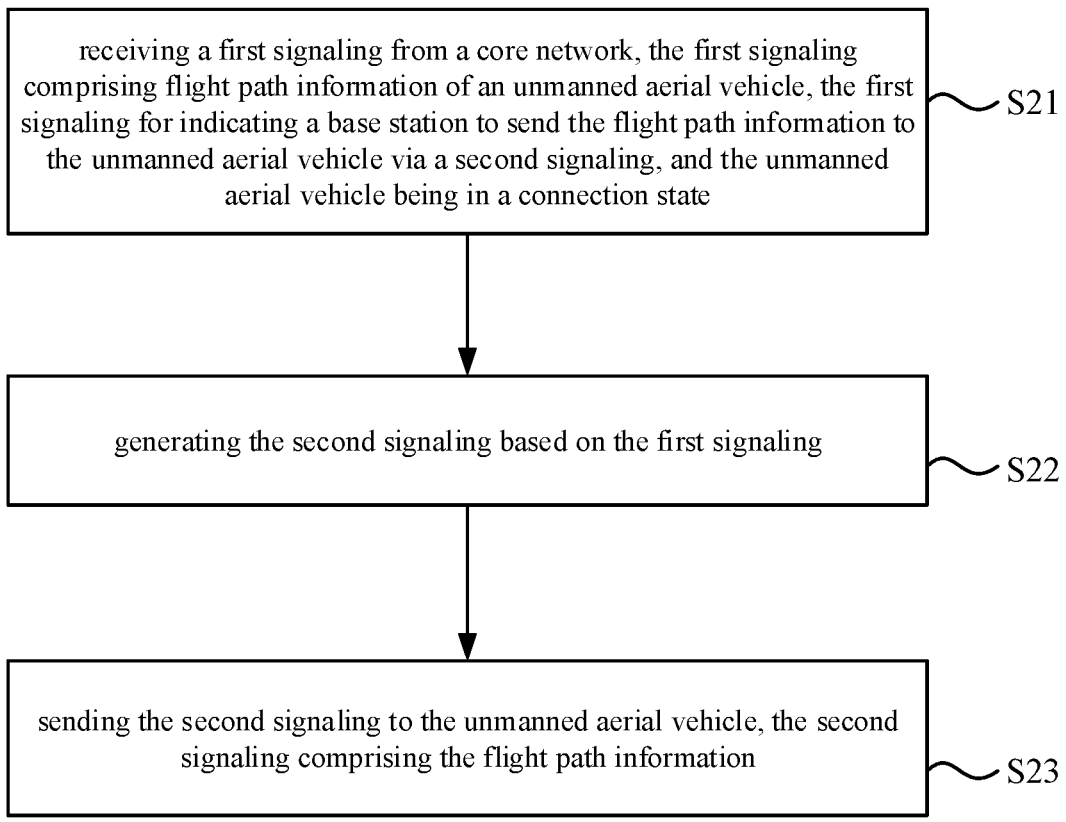
FIG. 5 is a flow chart illustrating another method for configuring a flight path according to exemplary embodiments of the disclosure.

FIG. 5 is a flow chart illustrating another method for configuring a flight path according to exemplary embodiments of the disclosure. The method for configuring the flight path illustrated in embodiments may be applicable to a base station. The base station may communicate with a core network. The base station may communicate with a user device. The user device may be an unmanned aerial vehicle. The unmanned aerial vehicle may be an unmanned aircraft, an unmanned airship or the like. A communication between the base station and the user device may be based on a LTE or an NR.

As illustrated in FIG. 5, the method for configuring the flight path includes the following.

At block S21, a first signaling is received from a core network. The first signaling includes flight path information of an unmanned aerial vehicle. The first signaling is configured to indicate the base station to send the flight path information to the unmanned aerial vehicle via a second signaling. The unmanned aerial vehicle is in a connection state.

At block S22, the second signaling is generated based on the first signaling.

At block S23, the second signaling is sent to the unmanned aerial vehicle. The second signaling includes the flight path information.

In some embodiments, for the unmanned aerial vehicle in the connection state, since there is a communication connection between the unmanned aerial vehicle and the base station, after receiving the flight path information sent by the core network, the base station may directly send the flight path information to the unmanned aerial vehicle having the communication connection with the base station.

Therefore, the core network may first determine the base station having the communication connection with the unmanned aerial vehicle, send the first signaling including the flight path information to the determined base station, and indicate the base station by the first signaling to send the flight path information via the second signaling to the unmanned aerial vehicle. The base station may generate the second signaling including the flight path information after receiving the first signaling, and send the second signaling to the unmanned aerial vehicle. In this way, it is implemented that the flight path information is sent from the core network to the unmanned aerial vehicle in the connection state, such that the unmanned aerial vehicle may configure the flight path based on the flight path information. Comparing with the related art, the configuration of the flight path may be completed based on a network of a telecom operator without establishing a proprietary link, and the configuration process is relatively simple.

Alternatively, the second signaling includes at least one of: a radio resource control signaling, and a media access control MAC control element CE.

In some embodiments, the base station may send the flight path information to the unmanned aerial vehicle via the radio resource control signaling or the MAC CE based on the first signaling sent by the core network. A way for sending the flight path information carried in the RRC signaling or in the MAC CE to unmanned aerial vehicle may be selected based on a requirement.

Figure 6:
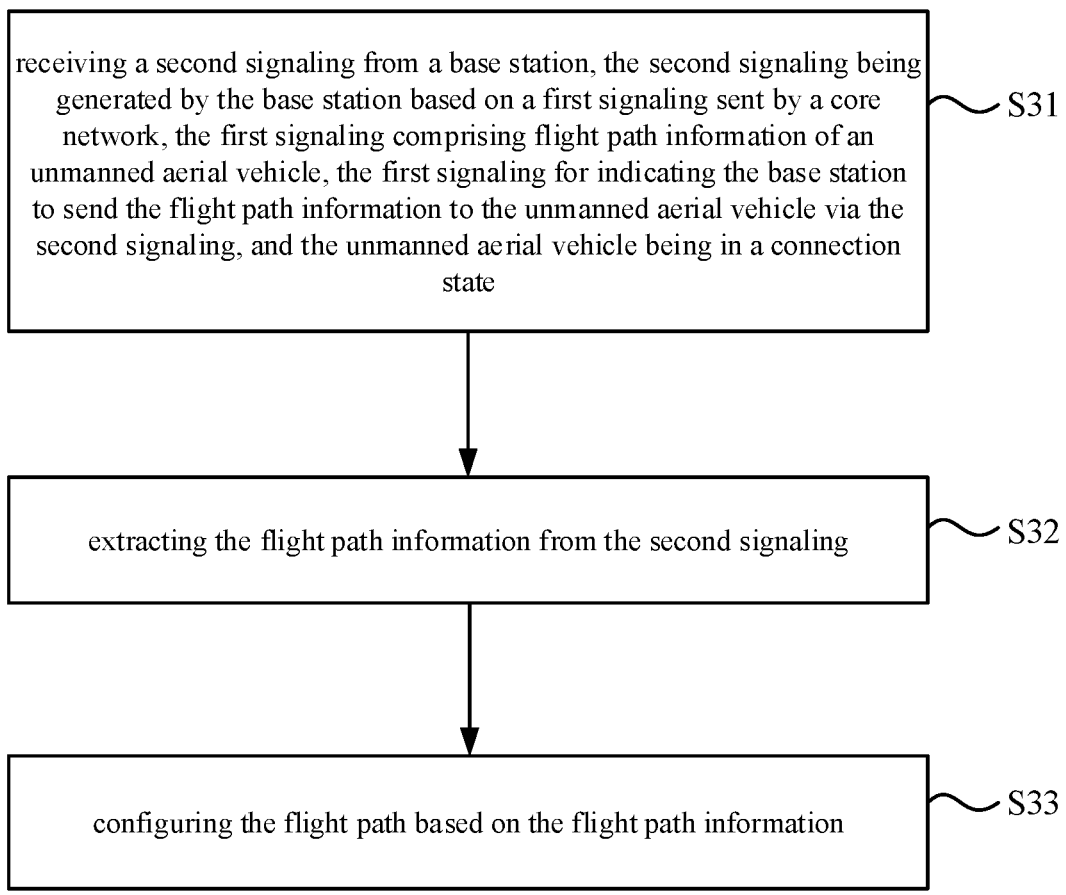
FIG. 6 is a flow chart illustrating another method for configuring a flight path according to exemplary embodiments of the disclosure.

FIG. 6 is a flow chart illustrating another method for configuring a flight path according to exemplary embodiments of the disclosure. The method for configuring the flight path illustrated in embodiments may be applicable to an unmanned aerial vehicle. The unmanned aerial vehicle may be an unmanned aircraft, an unmanned airship or the like. A communication between the base station and the unmanned aerial vehicle may be based on a LTE or an NR.

As illustrated in FIG. 6, the method for configuring the flight path includes the following.

At block S31, a second signaling is received from a base station. The second signaling is generated by the base station based on a first signaling sent by a core network. The first signaling includes flight path information of the unmanned aerial vehicle. The first signaling is configured to indicate the base station to send the flight path information to the unmanned aerial vehicle via the second signaling. The unmanned aerial vehicle is in a connection state.

At block S32, the flight path information is extracted from the second signaling.

At block S33, the flight path is configured based on the flight path information.

In some embodiments, for the unmanned aerial vehicle in the connection state, since there is a communication connection between the unmanned aerial vehicle and the base station, after receiving the flight path information sent by the core network, the base station may directly send the flight path information to the unmanned aerial vehicle having the communication connection with the base station.

Therefore, the core network may first determine the base station having the communication connection with the unmanned aerial vehicle, send the first signaling including the flight path information to the determined base station, and indicate the base station by the first signaling to send the flight path information via the second signaling to the unmanned aerial vehicle. The base station may generate the second signaling including the flight path information after receiving the first signaling, and send the second signaling to the unmanned aerial vehicle. In this way, it is implemented that the flight path information is sent from the core network to the unmanned aerial vehicle in the connection state, such that the unmanned aerial vehicle may configure the flight path based on the flight path information after receiving the flight path information. Comparing with the related art, the configuration of the flight path may be completed based on a network of a telecom operator without establishing a proprietary link, and the configuration process is relatively simple.

Alternatively, the second signaling includes at least one of: a radio resource control signaling, and a media access control MAC control element CE.

In some embodiments, the base station may send the flight path information to the unmanned aerial vehicle via the radio resource control signaling or the MAC CE based on the first signaling sent by the core network. Correspondingly, the unmanned aerial vehicle may obtain the flight path information by receiving the radio resource control signaling or the MAC CE. The way for obtaining the flight path information by receiving the radio resource control signaling or the MAC CE may be selected based on a signaling sent by the base station.

Figure 7:
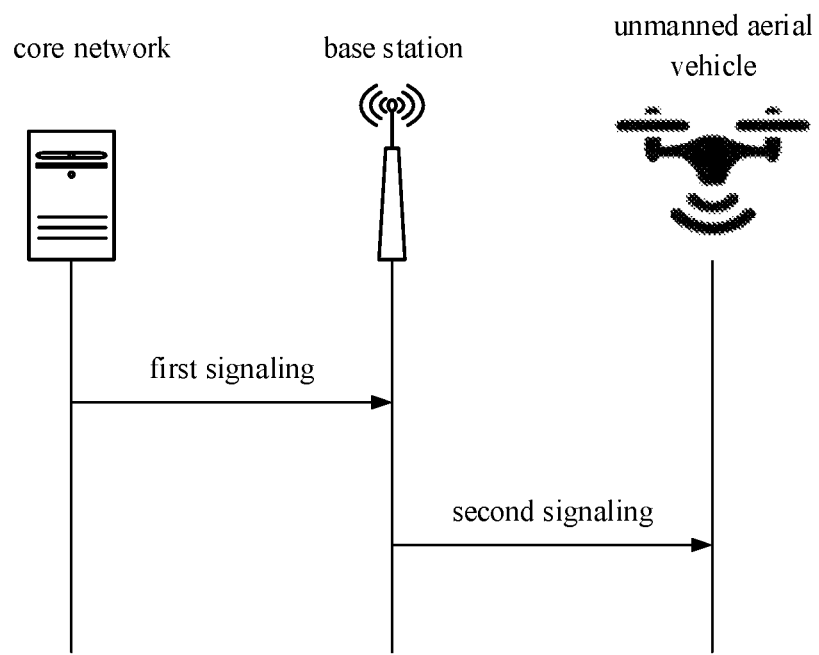
FIG. 7 is a schematic diagram illustrating an interaction among a core network, a base station and an unmanned aerial vehicle according to exemplary embodiments of the disclosure.

FIG. 7 is a schematic diagram illustrating an interaction among a core network, a base station and an unmanned aerial vehicle according to exemplary embodiments of the disclosure.

As illustrated in FIG. 7, after obtaining flight path information of an unmanned aerial vehicle in a connection state, a core network may send a first signaling to a base station having a communication connection with the unmanned aerial vehicle. The first signaling includes the flight path information. The base station may be indicated by the first signaling to send the flight path information to the unmanned aerial vehicle via a second signaling.

The base station may generate the second signaling based on the first signaling after receiving the first signaling. The second signaling includes the flight path information. The base station sends the flight path information to the unmanned aerial vehicle via the second signaling. The base station may directionally send the second signaling to the unmanned aerial vehicle since there is the communication connection between the base station and the unmanned aerial vehicle.

Since the second signaling includes the flight path information, the unmanned aerial vehicle may obtain the flight path information after receiving the second signaling, and configure the flight path based on the flight path information, thereby flying based on the configured flight path.

Corresponding to the above embodiments of the method for configuring the flight path, the disclosure also provides embodiments of an apparatus for configuring the flight path.

Figure 8:
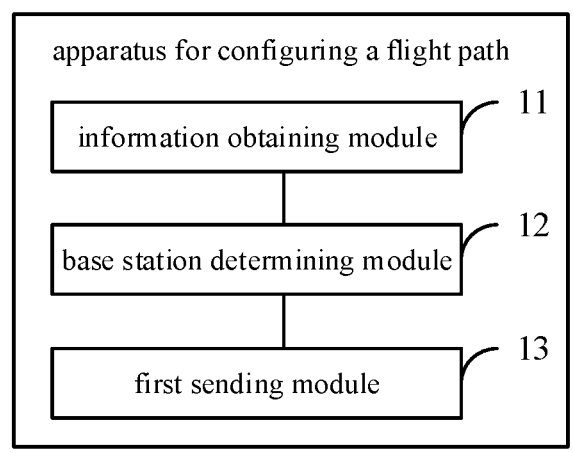
FIG. 8 is a block diagram illustrating an apparatus for configuring a flight path according to exemplary embodiments of the disclosure.

FIG. 8 is a block diagram illustrating an apparatus for configuring a flight path according to exemplary embodiments of the disclosure. The apparatus for configuring the flight path illustrated in embodiments may be applicable to a core network. The core network may communicate with a base station. The base station may communicate with a user device. The user device may be an unmanned aerial vehicle. The unmanned aerial vehicle may be an unmanned aircraft, an unmanned airship or the like. A communication between the base station and the user device may be based on a long term evolution (LTE) or a new radio (NR).

As illustrated in FIG. 8, the apparatus for configuring the flight path includes an information obtaining module 11, a base station determining module 12, and a first sending module 13.

The information obtaining module 11 is configured to obtain flight path information of an unmanned aerial vehicle. The unmanned aerial vehicle is in a connection state.

The base station determining module 12 is configured to determine a base station having a communication connection with the unmanned aerial vehicle.

The first sending module 13 is configured to send a first signaling to the base station. The first signaling includes the flight path information. The first signaling is configured to indicate the base station to send the flight path information to the unmanned aerial vehicle via a second signaling.

Alternatively, the information obtaining module 11 is configured to: obtain the flight path information from a terminal running an unmanned aerial-vehicle management system. The unmanned aerial-vehicle management system is configured to configure the flight path information for the unmanned aerial vehicle.

Alternatively, the first signaling includes at least one of: an initial context setup request and a user equipment UE context modification request.

Alternatively, the first sending module is configured to: send the initial context setup request to the base station in response to that the flight path information is obtained before or when a communication connection with the unmanned aerial vehicle is initially established through the base station.

Alternatively, the first sending module is configured to: send the UE context modification request to the base station in response to the flight path information is obtained after a communication connection with the unmanned aerial vehicle has been established through the base station.

Alternatively, the second signaling includes at least one of: a radio resource control signaling, and a media access control MAC control element CE.

Figure 9:
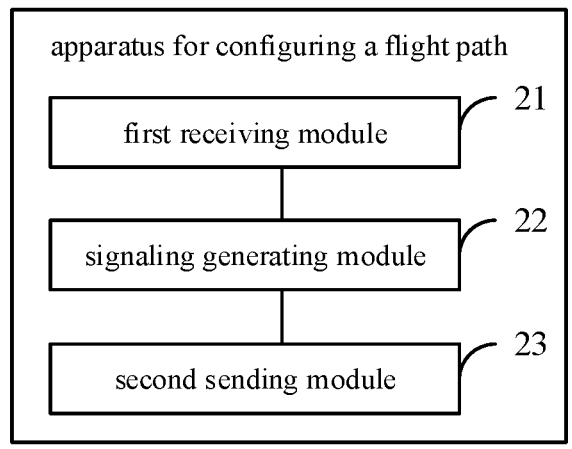
FIG. 9 is a block diagram illustrating another apparatus for configuring a flight path according to exemplary embodiments of the disclosure.

FIG. 9 is a block diagram illustrating another apparatus for configuring a flight path according to exemplary embodiments of the disclosure. The apparatus for configuring the flight path illustrated in embodiments may be applicable to a base station. The base station may communicate with a core network. The base station may communicate with a user device. The user device may be an unmanned aerial vehicle. The unmanned aerial vehicle may be an unmanned aircraft, an unmanned airship or the like. A communication between the base station and the user device may be based on a LTE or an NR.

As illustrated in FIG. 9, the apparatus for configuring the flight path includes: a first receiving module 21, a signaling generating module 22, and a second sending module 23.

The first receiving module 21 is configured to receive a first signaling from a core network. The first signaling includes flight path information of an unmanned aerial vehicle. The first signaling is configured to indicate the base station to send the flight path information to the unmanned aerial vehicle via a second signaling. The unmanned aerial vehicle is in a connection state.

The signaling generating module 22 is configured to generate the second signaling based on the first signaling.

The second sending module 23 is configured to send the second signaling to the unmanned aerial vehicle. The second signaling includes the flight path information.

Alternatively, the second signaling includes at least one of: a radio resource control signaling, and a media access control MAC control element CE.

Figure 10:
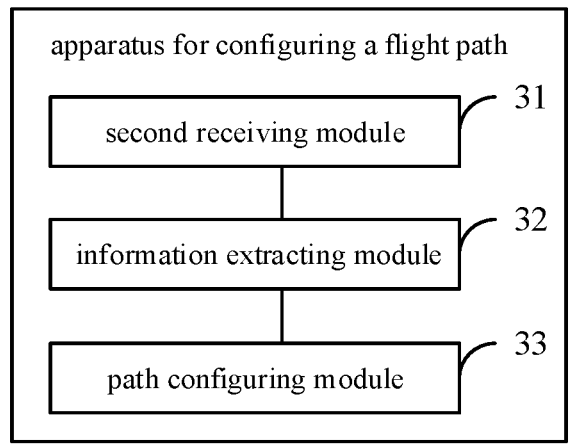
FIG. 10 is a block diagram illustrating another apparatus for configuring a flight path according to exemplary embodiments of the disclosure.

FIG. 10 is a block diagram illustrating another apparatus for configuring a flight path according to exemplary embodiments of the disclosure. The apparatus for configuring the flight path illustrated in embodiments may be applicable to an unmanned aerial vehicle. The unmanned aerial vehicle may be an unmanned aircraft, an unmanned airship or the like. A communication between the base station and the unmanned aerial vehicle may be based on a LTE or an NR.

As illustrated in FIG. 10, the apparatus for configuring the flight path includes: a second receiving module 31, an information extracting module 32, and a path configuring module 33.

The second receiving module 31 is configured to receive a second signaling from a base station. The second signaling is generated by the base station based on a first signaling sent by a core network. The first signaling includes flight path information of an unmanned aerial vehicle. The first signaling is configured to indicate the base station to send the flight path information to the unmanned aerial vehicle via the second signaling. The unmanned aerial vehicle is in a connection state.

The information extracting module 32 is configured to extract the flight path information from the second signaling.

The path configuring module 33 is configured to configure the flight path based on the flight path information.

Alternatively, the second signaling includes at least one of: a radio resource control signaling, and a media access control MAC control element CE.

With regard to the apparatuses in the above embodiments, the specific manners for performing operations for individual modules therein have been described in detail in the embodiments regarding the methods, which will not be elaborated herein.

The apparatus embodiments basically correspond to the method embodiments. Therefore, the relevant part of the apparatus embodiments may refer to the description of the method embodiments. The apparatus embodiments described above are only illustrative. The units described as separate components may or may not be physically separated, and the components illustrated as units may or may not be physical units. That is, the components or units may be located in one place or distributed to multiple network units. A part or all of the modules may be selected based on an actual requirement to achieve the purpose of embodiments of the disclosure. The skilled in the art may understand and implement embodiments of the disclosure without any creative labor.

Embodiments of the disclosure also provide an electronic device. The electronic device includes: a processor and a memory. The memory is configured to store instructions executable by the processor. The processor is configured to implement the method according to any one of the above embodiments.

Embodiments of the disclosure also provide a computer-readable storage medium having a computer program stored thereon. The computer program is configured to implement the method according to any one of the above embodiments when executed by a processor.

Figure 11:
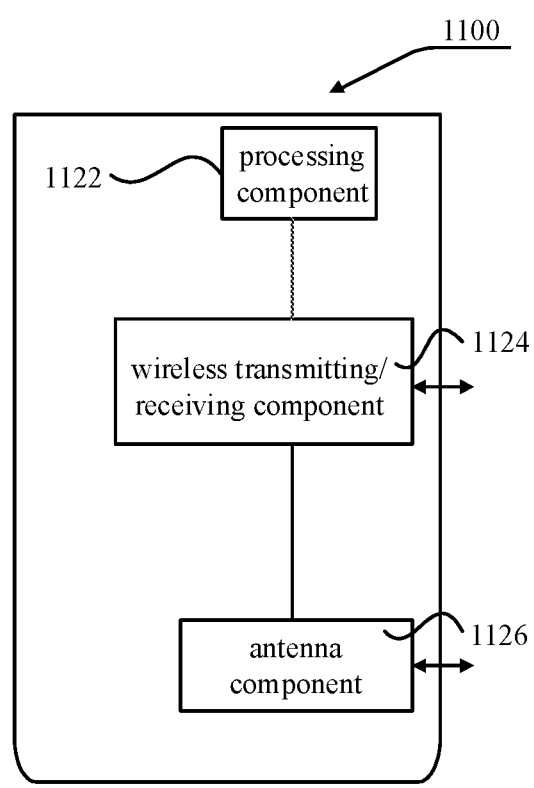
FIG. 11 is a block diagram illustrating a device for configuring a flight path according to exemplary embodiments of the disclosure.

As illustrated in FIG. 11, FIG. 11 is a block diagram illustrating a device 1100 for configuring a flight path according to exemplary embodiments of the disclosure. The device 1100 may be provided as a base station. With reference to FIG. 11. The device 1100 includes a processing component 1122, a wireless transmitting/receiving component 1124, an antenna component 1126, and a signal processing part specific to a wireless interface. The processing component 1122 may further include one or more processors. One of the one or more processors in the processing component 1122 may be configured to implement the method according to any one of the above embodiments.

Figure 12:
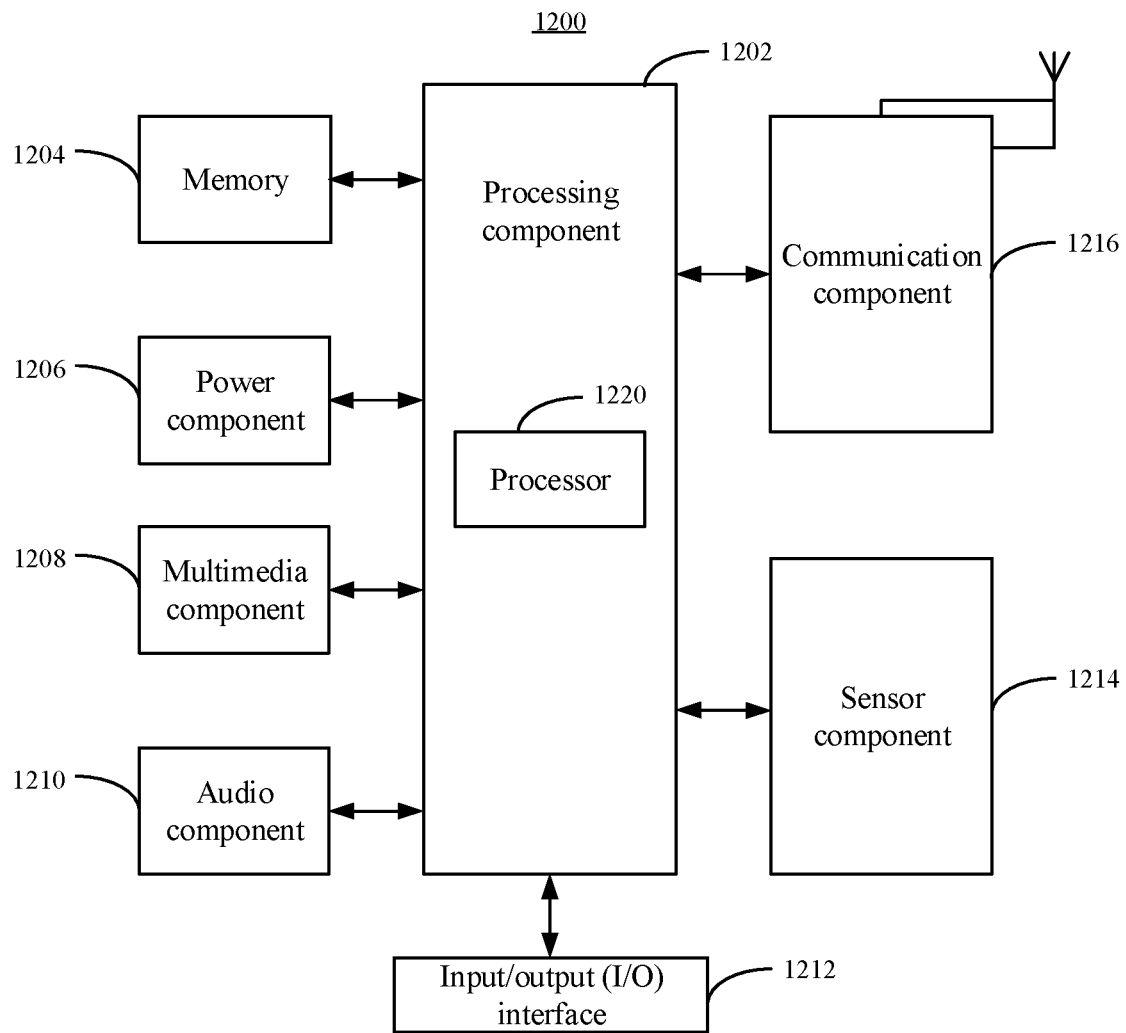
FIG. 12 is a block diagram illustrating a device for configuring a flight path according to exemplary embodiments of the disclosure.

FIG. 12 is a block diagram illustrating a device 1200 for configuring a flight path according to exemplary embodiments of the disclosure. For example, the device 1200 may be a mobile phone, a computer, a digital broadcasting terminal, a message sending and receiving equipment, a game controller, a tablet device, a medical device, a fitness equipment, a personal digital assistant or the like.

As illustrated in FIG. 12, the device 1200 may include one or more of: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200 for performing the directional operation, contraction data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 is configured to provide power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device 1200 is in an operation mode, such as an adjustment mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") for receiving an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 is configured to provide an interface between the processing component 1202 and peripheral interface modules, such as a keyboard, a click wheel, buttons, and the like. The buttons may include, but be not limited to, a home button, a volume button, a starting button, and a locking button.

The sensor component 1214 includes one or more sensors for providing status assessments of various aspects of the device 1200. For example, the sensor component 1214 may detect an open/closed status of the device 1200, relative positioning of components, e.g., the display and the keypad of the device 1200, a change in position of the device 1200 or a component of the device 1200, a presence or absence of user contraction with the device 1200, an orientation or an acceleration/deceleration of the device 1200, and a change in temperature of the device 1200. The sensor component 1214 may include a proximity sensor for detecting the presence of nearby objects without any physical contact. The sensor component 1214 may also include a light sensor, such as a CMOS (complementary metal-oxide-semiconductor)) or a CCD (charge coupled device) image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 may access a wireless network based on a communication standard, such as Wi-Fi, 2G, or 3G, or a combination thereof. In one exemplary embodiment, the communication component 1216 receives a broadcast signal or broadcast associated information from an external broadcast management system via a broadcast channel. In an exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In exemplary embodiments, there is also provided a non-transitory computer-readable storage medium including instructions, such as the memory 1204 including the instructions. The instruction may be executed by the processor 1220 in the device 1200 for performing the above method. For example, the non-transitory computer-readable storage medium may be a ROM, a RAM, a CD-ROM, a magnetic tape, a floppy disc, an optical data storage device, and the like.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only be limited by the appended claims.

It should be noted that, in the specification, relational terms such as first and second are used only to distinguish one entity or operation from another, and do not necessarily require or imply any actual relationship or order between these entities or operations. The terms "including", "containing" or any other variation thereof are intended to cover non-exclusive inclusion, such that a process, method, article or device including a series of elements includes not only those elements, but also other elements not explicitly listed, or may also include elements inherent to such process, method, article or device. Without further limitation, for an element defined by a sentence "including one . . . ", it is not excluded that there are other identical elements in the process, method, article or device including the element.

Description is made in detail above to the method and the apparatus provided by embodiments of the disclosure. In the specification, a specific example is applied to illustrate the principle and implementation of the disclosure, and the description for the above embodiments is only used to help understand the method and a core idea of the disclosure. Meanwhile, based on the idea of the disclosure, there may be some changes in the specific implementation and application scope for the skilled in the art. In conclusion, the content of this specification should not be construed as limiting the disclosure.

What is claimed is:

1. A method for configuring a flight path, comprising:
obtaining, by a core network, flight path information of an unmanned aerial vehicle in a connection state;
determining, by the core network, a base station having a communication connection with the unmanned aerial vehicle; and
sending, by the core network, a first signaling to the base station, wherein the first signaling comprises the flight path information, and the first signaling instructs the base station to send the flight path information to the unmanned aerial vehicle via a second signaling,
wherein the first signaling comprises at least one of following requests:
an initial context setup request, or
a user equipment (UE) context modification request.

2. The method of claim 1, wherein obtaining the flight path information of the unmanned aerial vehicle comprises:
obtaining the flight path information from a terminal running an unmanned aerial-vehicle management system, wherein the unmanned aerial-vehicle management system configures the flight path information for the unmanned aerial vehicle.

3. The method of claim 1, wherein sending the first signaling to the base station comprises:
sending the initial context setup request to the base station in response to obtaining the flight path information, wherein the flight path information is obtained before or in response to initially establishing a communication connection with the unmanned aerial vehicle through the base station.

4. The method of claim 1, wherein sending the first signaling to the base station comprises:
sending the UE context modification request to the base station in response to obtaining the flight path information, wherein the flight path information is obtained after a communication connection with the unmanned aerial vehicle has been established through the base station.

5. The method of claim 1, wherein the second signaling comprises at least one of following parameters:
a radio resource control signaling, and
a media access control (MAC) control element (CE).

6. A method for configuring a flight path, comprising:
receiving, by a base station, a first signaling from a core network, wherein the first signaling comprises flight path information of an unmanned aerial vehicle, the first signaling instructs the base station to send the flight path information to the unmanned aerial vehicle via a second signaling, and the unmanned aerial vehicle is in a connection state;
generating, by the base station, the second signaling based on the first signaling; and
sending, by the base station, the second signaling to the unmanned aerial vehicle, wherein the second signaling comprises the flight path information,
wherein the first signaling comprises at least one of following requests:
an initial context setup request, or
a user equipment (UE) context modification request.

7. The method of claim 6, wherein the second signaling comprises at least one of following parameters:
a radio resource control signaling, and
a media access control (MAC) control element (CE).

8. A method for configuring a flight path, comprising:
receiving, by an unmanned aerial vehicle, a second signaling from a base station, wherein the second signaling is generated by the base station based on a first signaling sent by a core network, the first signaling comprises flight path information of the unmanned aerial vehicle, the first signaling instructs the base station to send the flight path information to the unmanned aerial vehicle via the second signaling, and the unmanned aerial vehicle is in a connection state,
wherein the first signaling comprises at least one of following requests:
an initial context setup request, or
a user equipment (UE) context modification request;
extracting, by the unmanned aerial vehicle, the flight path information from the second signaling; and
configuring, by the unmanned aerial vehicle, the flight path based on the flight path information.

9. The method of claim 8, wherein the second signaling comprises at least one of following parameters:
a radio resource control signaling, and
a media access control (MAC) control element (CE).

10. A core network device, comprising:
a processor; and
a memory, configured to store instructions executable by the processor,
wherein the processor is configured to:
obtain flight path information of an unmanned aerial vehicle in a connection state;
determine a base station having a communication connection with the unmanned aerial vehicle; and
send a first signaling to the base station, wherein the first signaling comprises the flight path information, and the first signaling instructs the base station to send the flight path information to the unmanned aerial vehicle via a second signaling,
wherein the first signaling comprises at least one of following requests:
an initial context setup request, or
a user equipment (UE) context modification request.

11. The device of claim 10, wherein the processor is configured to:
obtain the flight path information from a terminal running an unmanned aerial-vehicle management system, wherein the unmanned aerial-vehicle management system configures the flight path information for the unmanned aerial vehicle.

12. The device of claim 10, wherein the processor is configured to:
send the initial context setup request to the base station in response to obtaining the flight path information, wherein the flight path information is obtained before or in response to initially establishing a communication connection with the unmanned aerial vehicle through the base station.

13. The device of claim 10, wherein the processor is configured to:
send the UE context modification request to the base station in response to obtaining the flight path information, wherein the flight path information is obtained after a communication connection with the unmanned aerial vehicle has been established through the base station.

14. The device of claim 10, wherein the second signaling comprises at least one of following parameters:
a radio resource control signaling, and
a media access control (MAC) control element (CE).

15. A base station, comprising:
a processor; and
a memory, configured to store instructions executable by the processor,
wherein the processor is configured to:
receive a first signaling from a core network, wherein the first signaling comprises flight path information of an unmanned aerial vehicle, the first signaling instructs a base station to send the flight path information to the unmanned aerial vehicle via a second signaling, and the unmanned aerial vehicle is in a connection state;
generate the second signaling based on the first signaling; and
send the second signaling to the unmanned aerial vehicle, wherein the second signaling comprises the flight path information,
wherein the first signaling comprises at least one of following requests:

an initial context setup request, or a user equipment (UE) context modification request.

16. The base station of claim 15, wherein the second signaling comprises at least one of following parameters:

a radio resource control signaling, and a media access control (MAC) control element (CE).

17. An unmanned aerial vehicle, comprising:

a processor; and a memory, configured to store instructions executable by the processor, wherein the processor is configured to:

receive a second signaling from a base station, wherein the second signaling is generated by the base station based on a first signaling sent by a core network, the first signaling comprises flight path information of the unmanned aerial vehicle, the first signaling instructs the base station to send the flight path information to the unmanned aerial vehicle via the second signaling, and the unmanned aerial vehicle is in a connection state, wherein the first signaling comprises at least one of following requests:

an initial context setup request, or a user equipment (UE) context modification request;

extract flight path information from the second signaling; and configure the flight path based on the flight path information.

18. The unmanned aerial vehicle of claim 17, wherein the second signaling comprises at least one of following parameters:

a radio resource control signaling, and a media access control (MAC) control element (CE).

* * * * *